United States Patent Office 3,368,057
Patented Feb. 6, 1968

3,368,057
METHOD OF BONDING
Dean K. Hanink, Indianapolis, Ind., assignor to General Motors Corporation, Detroit, Mich., a corporation of Delaware
No Drawing. Original application Mar. 15, 1962, Ser. No. 180,043, now Patent No. 3,339,269, dated Sept. 5, 1967. Divided and this application June 22, 1967, Ser. No. 647,903.
5 Claims. (Cl. 219—92)

ABSTRACT OF THE DISCLOSURE

A method of bonding and the joint resulting therefrom involving boronizing a surface to be joined, assembling the surface in the desired manner and spot welding such that the boron-rich layer and the base metal are fused in a localized region to form a spot weld or nugget which extends through the boron-rich layer. The temperature immediately surrounding the weld nugget is sufficient to fuse only the boron-rich layer about the nugget, which layer upon cooling further brazes the parts to be joined. A welded joint having a circumscribing brazed joint is produced.

---

This is a division of application Ser. No. 180,043 entitled, "Method of Bonding," which was filed Mar. 15, 1962, now Patent No. 3,339,269, dated Sept. 5, 1967, and is assigned to the assignee of the present invention.

It is an object of the invention to provide a method of bonding metal parts by interdiffusion of a low melting point alloy which forms an integral part of the surface of one of two elements being joined.

It is a further object of the invention to provide an improved method of spot welding.

A further object of the invention is to provide an improved bonded product.

These and other objects, features and advantages of the invention that will become more apparent from the following discussion are attained by boronizing the surface of a metal to form a surface layer therein which has a melting point lower than that of the basis metal, itself. This boronized surface is placed in contact with the surface of a metallurgically compatible metal. While the surfaces are in mutual contact, the metals are heated to a temperature high enough to promote interdiffusion between the boronized surface layer and the contacting surface. This interdiffusion results in a metallurgically bonded assembly in which the two metals are joiner together by means of a boron-rich interlayer. In the preferred embodiment as comprehended by the incident invention the joining heat is supplied by contacting electrodes of the resistance heating type conventional to the spot welding art.

Serving as a specific example of the alternate embodiment as disclosed and claimed in the aforesaid United States Ser. No. 180,043 invention is the following description of the process used to join two parts made of a nickel base alloy containing about 0.08% maximum carbon, 1.0% manganese, 9% iron, .55% silicon, .2% copper, 15% chromium, 2.5% titanium, .6% aluminum, 1% columbium and the balance substantially nickel. The nickel base alloy is preferably cleaned prior to boronizing to remove dirt, grease, etc. The cleaning can be accomplished in the normal and accepted manner for cleaning a nickel base alloy, such as degreasing in trichloroethylene or the like. Where a metal part is severely oxidized, as is a frequent problem with many ferrous base alloys, it may be desired to additionally descale the part, as, for example, in an aqueous 1% hydrochloric acid solution. After cleaning, the parts are boronized by immersion in a fused sodium tetraborate bath in which approximately 15%, by weight, boron carbide has been dissolved. The bath is maintained at a temperature of about 1700° F. The parts are immersed for approximately one hour to obtain a visible case depth of about 0.001 inch. The parts are then removed from the boronized bath, cooled and assembled in the desire contacting relationship. They are then heated in a low oxygen environment, e.g., a vacuum furnace and in this environment held at a temperature of approximately 2150° F. for approximately 30 minutes. Then the parts are cooled in a low oxygen environment to room temperature and are ready for use.

The modification of the aforesaid process which comprises the essence of the incident invention involves the spot welding of boronized metal parts. In this invention, the parts are prepared as substantially described in the preceding embodiment. However, instead of merely heating assembled parts to a suitable bonding temperature, the parts are subjected to a resistance heating by means of contacting electrodes which fuse not only the boron-rich layer but the base metal, itself, to fuse the metal parts together. However, in addition to the welding which is thus obtained, there is a supplemental effect. Surrounding the weld area or nugget of the spot weld is an area which has reached a temperature high enough to interdiffuse the lower melting boron-rich layer with its contacting surface but not high enough to fuse the base metal, itself. Hence, the nugget is surrounded by a bonded area in which the two metal parts are joined through the boron-rich layer.

The use of boronized parts in spot welding increases the strength of the bond so obtained. Not only can steel be bonded to steel, and nickel to nickel, in this manner but also steel to nickel by boronizing at least one, and preferably both of the contacting surfaces involved. A 0.03 inch thick sheet of a ferrous alloy containing about 25% chromium, 20.5% nickel, 0.25% maximum carbon and the balance substantially iron was bonded to a 0.03 inch thick sheet of a nickel base alloy containing about .2% copper, 7.5% iron, 15.5% chromium, .25% silicon, .25% manganese and the balance substantially nickel. The sheets were boronized at about 1800° F. for about 15 minutes in a sodium tetraborate bath in which about 15%, by weight, boron carbide had been dissolved. These two sheets were spot welded using matched cylindrical electrodes. Each electrode had a diameter of about 0.25 inch, which had a contact area of about 0.049 square inch. The area of the metallurgical bond was increased to approximately 0.375 inch in diameter so as to present an area of about 0.098 square inch. Hence, the metallurgical bond is almost double that which normally is attained.

The specific method of spot welding which is employed is no more significant to the practice of this embodiment of the invention than it is to any spot welding. Therefore, any of the known and accepted forms of spot welding can be employed. A particularly significant feature of this embodiment of the invention is that it does not require a protective atmosphere during the bonding step. The heating and cooling occurs so rapidly that there is little opportunity for metal degradation due to oxidation at the high bonding temperature.

It is to be appreciated that, in general, my process is applicable to any metal which forms a eutectic mixture with boron. Metals, such as ferrous base alloys, including low alloy steels, stainless steels and the like, nickel base alloys, cobalt base alloys, etc., can be joined in accordance with my invention. While the process is, therefore, applicable to many metals I have found the process to be especially satisfactory when practiced with nickel base alloys. Not only does the nickel-boron eutectic have a melting point temperature significantly lower than that of the pure nickel alloy but it also has highly satisfactory physical properties which make it particularly suitable as a brazing material.

The particular method of boronizing which is employed in the practice of my invention is not especially significant. One can use any method of boronizing which will produce the desired degree of boron impregnation. Metals can be boronized by exposure to boron carbonyl gas at an elevated temperature. Boronizing can also be accomplished by electrolysis of a molten borate bath, such as sodium tetraborate. However, I prefer to use other boronizing processes. More specifically, I prefer to apply those boronizing baths and processes described and claimed in United States Patent No. 3,201,285, entitled "Boronizing Bath and Method," which issued Aug. 17, 1965, in the names of Vernon L. Hill and Thomas F. Stapleton, and United States Patent No. 3,201,286, entitled "Method of Boronizing," which issued Aug. 17, 1965, in the names of Vernon L. Hill and Thomas F. Stapleton, both applications being assigned to the assignee of the present invention. Each of these United States patents pertains to an immersion boronizing bath of a molten salt bath in which free boron diffuses into the surface of a metal being treated. A molten bath of sodium tetraborate, for example, which is at a temperature of approximately 1700° F. to 1800° F. in which approximately 15% boron carbide has been dissolved can be used. In place of boron carbide, approximately 12%, by weight, elemental boron can be dissolved in the sodium tetraborate. Approximately 25%, by weight, magnesium will liberate enough boron in a molten sodium tetraborate to satisfactorily boronize most metals.

While in most instances it is desired to uniformly boronize a metal part throughout its surface, in some instances it is desired to selectively boronize only those areas of the surface which are to be joined. The configuration of the part may not allow appropriate selective boronizing by partial immersion. In such instances, one can immerse the whole part and selectively boronize by employing a stop off to inhibit impregnation of the portions of the surface not to be boronized. An electrodeposited copper coating formed in the usual manner for making such coatings on the basis metal involved can be effectively used as a stop off material. By use of an appropriate electroplating maskant, the copper coating can be applied only to those areas where the stop off is desired. On the other hand, the copper coating can be applied to the entire surface and then subsequently removed mechanically or chemically from those areas of the surface where boronizing is desired. Since various boronizing methods can be used, the time, temperature and other conditions of boronizing are variable. Moreover, even with the preferred immersion boronizing baths previously referred to, these conditions can vary. The boronizing rate is accelerated by concentration of free boron and by temperature. Moreover, boron diffuses more quickly into some metals than others. Other influencing factors are the melting point temperature of the metal being boronized, the melting point of the resultant boron-containing surface layer, the desired visible depth of this layer and the desired hardness of this layer.

In general, the preferred means for boronizing as well as the specific conditions used in accomplishing the boronizing are primarily based upon the nature of the boron-rich surface layer which is desired. If an extremely thin, boron-rich surface layer, comparatively high in boron content, is desired a relatively short, low temperature boronizing treatment would be employed. On the other hand, if a relatively thick, boron-rich surface layer is desired, a longer boronizing treatment would be employed. It may be preferred to establish a comparatively thick, boron-rich surface layer in which the boron concentration is comparatively low. In such instance, the boronizing treatment is accomplished at a higher temperature and, if desired, can be followed by a heat treatment. The post-boronizing heat treatment diffuses the boron more deeply into a part to reduce the boron concentration immediately adjacent the surface thereof. The boron concentration in the boron-rich surface layer, or case, directly affects the melting point temperature of this layer. Hence, the specific boronizing treatment used will be dependent also upon the case melting point temperature desired.

Generally satisfactory results can be obtained using a visible case depth of approximately 0.0001 inch through 0.006 inch. However, in most instances, I prefer to employ visible case depths of approximately 0.0003 inch through 0.001 inch, especially for nickel base alloys.

After the parts are boronized, they are assembled for bonding as they would be for any brazing operation. Therefore, flow of metal when the boron-rich layer reaches its liquidous temperature should be considered when physically disposing the parts in assembly for bonding.

As previously indicated, heating the metal members will induce diffusion of the boron deeper into the surface of the metal part and concurrently decrease the boron concentration immediately adjacent the surface. Accompanying this reduction in boron concentration is an increase in the melting point of the boron-rich layer. Consequently, when heating the assembled metal parts for bonding, the heating rate should not be so slow as to induce an undesirable degree of boron diffusion before the liquidous temperature of the boron base metal eutectic alloy is attained. While in some instances temperature increases as low as 15° F. per minute have been successfully used, the rapid indeterminately fast heating attained by immersing assembled parts in a molten salt bath has also been successfully used. Moreover, the post-boronizing diffusion step may be eliminated in favor of a slower preheating prior to brazing. However, the rate of heating is, at most, significant in obtaining optimum results in a particular instance and is no more critical to practice of the invention than in brazing in the known and accepted manner.

The duration that the assembled parts are maintained at the bonding temperatures can be varied from a few minutes up to several hours, as is customary in the known and accepted methods of brazing. However, I have found that durations of approximately 15 minutes to one hour are generally adequate. In essence, the bonding temperature need only be maintained long enough to attain adequate interdiffusion of the contacting surfaces to yield a strong enough bond for the purpose intended. For most purposes, the bonding temperature is a temperature at which the boron-rich layer, or case, is molten.

The minimum bonding temperature usually preferred is generally the melting point temperature of the case. The maximum bonding temperature, of course, is the melting point temperature of the base metal of the part. For most ferrous and nickel base alloys, a bonding temperature of about 2150° F. is preferred but in many instances, especially in nickel base alloys, a lower bonding temperature can be used, e.g., 2000° F. In some instances, it may be desired to promote interdiffusion of metal between the boron-rich layer and the metal of a contacting surface without melting the boron-rich layer. In such instance, a temperature below the melting point temperature of the boron-rich surface layer would be used but sufficiently high enough to promote this interdiffusion.

When bonding highly oxidizable metals, such as low alloy steels, I prefer to protect them from oxidation during the heating step. This can be accomplished by bonding the samples under the usual conditions for vacuum brazing, under the protective atmosphere of carbon dioxide, hydrogen, helium, argon or the like, or by immersion of the samples in a molten salt bath. The specific manner of protection which I prefer to use is dependent upon the nature of the metals being bonded and the type of bond which is desired. Moreover, when heating in a molten salt bath, it is to be understood that it may be preferred, in some instances, to concurrently braze and boronize. In such instance, the boronizing would be accomplished in a bath of sodium tetraborate which is maintained at approximately 2150° F. and in which approximately 15%, by weight, boron carbide has been dissolved. While I prefer to boronize at a lower temperature and then subsequently bond assembled parts together at a higher temperature, it is possible to concurrently both boronize and bond. In such instance, the parts are cleaned and assembled and then immersed in the boronizing bath which is at the elevated temperature.

In general, the method of cooling is not particularly significant to the acquisiton of satisfactory results. However, in some instances, as in any brazing it may be desired to control the rate of cooling to inhibit fracture caused by thermal stresses which result from differences in cooling rates between materials and differences in expansion coefficients.

It is to be understood that although this invention has been described in connection with certain specific examples thereof, no limitation is intended thereby except as defined in the appended claims.

I claim:
1. The process of bonding metals which form a eutectic with boron which comprises impregnating the surface of a substrate metal with boron to form a boron-rich surface layer therein, placing said boron impregnated surface in contact with the surface of a metallurgically compatible metal, locally heating said metals within the area defined by said contacting surfaces so as to fuse said metals at the situs of said local heating and providing a decreasing temperature gradient extending outward from said situs such that the temperature of the area circumscribing said situs is insufficient to fuse said substrate metal but sufficient to fuse said boron-rich surface to bond said metals together through a joint which combines a fused substrate metal nucleus and a fused surface circumscribing said nucleus.

2. The process as claimed in claim 1 wherein said local heating is accomplished by spot welding.

3. The process as claimed in claim 2 wherein said surface is impregnated with boron to a depth of 0.0001 to 0.006 inch.

4. The process as claimed in claim 2 wherein said surface is impregnated with boron to a depth of 0.0003 to 0.001 inch.

5. A brazed and welded joint between metallurgically compatible metals at least one of which is selected from the group consisting of metals which form a eutectic with boron comprising a spot welded area circumscribed by a contiguous bonded area of an interdiffused boronized surface.

References Cited
UNITED STATES PATENTS

| | | | |
|---|---|---|---|
| 2,790,891 | 4/1957 | Welsh | 219—91 |
| 2,819,381 | 1/1958 | Lindow et al. | 219—92 |
| 3,038,988 | 6/1962 | Kessler et al. | 219—91 |
| 3,121,785 | 2/1964 | Terrill et al. | 219—92 |

RICHARD M. WOOD, *Primary Examiner.*

W. D. BROOKS, *Assistant Examiner.*